US012037978B2

(12) United States Patent
Cnossen et al.

(10) Patent No.: US 12,037,978 B2
(45) Date of Patent: Jul. 16, 2024

(54) AEROELASTIC STABLE WIND TURBINE BLADE

(71) Applicant: LM WIND POWER A/S, Kolding (DK)

(72) Inventors: Jelmer Cnossen, Eastleigh (GB); Afroz Akhtar, Ben-galuru (IN); Rajkumar Sivanantham, Ben-galuru (IN); Christian Frank Andersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/032,939

(22) PCT Filed: Nov. 19, 2021

(86) PCT No.: PCT/EP2021/082305
§ 371 (c)(1),
(2) Date: Apr. 20, 2023

(87) PCT Pub. No.: WO2022/106620
PCT Pub. Date: May 27, 2022

(65) Prior Publication Data
US 2023/0392577 A1 Dec. 7, 2023

(30) Foreign Application Priority Data

Nov. 20, 2020  (IN) .............................. 202041050597
Dec. 10, 2020  (GB) ...................................... 2019488

(51) Int. Cl.
F03D 1/06 (2006.01)
(52) U.S. Cl.
CPC ...... *F03D 1/0681* (2023.08); *F05B 2260/964* (2013.01); *F05B 2280/6013* (2013.01)

(58) Field of Classification Search
CPC .... F03D 1/0681; F03D 1/0682; F03D 1/0679; F03D 1/0684; F03D 1/0675; F05B 2260/964; F05B 2280/6013
See application file for complete search history.

(56) References Cited

U.S. PATENT DOCUMENTS

2010/0135818 A1   6/2010   Babu et al.
2016/0377049 A1   12/2016  Yarbrough et al.
(Continued)

FOREIGN PATENT DOCUMENTS

WO   2012164305 A1   12/2012
WO   2015009412 A2   1/2015
WO   2015009412 A3   1/2015

*Primary Examiner* — David E Sosnowski
*Assistant Examiner* — Maxime M Adjagbe
(74) *Attorney, Agent, or Firm* — Nath, Goldberg & Meyer; Jerald L. Meyer; Tanya E. Harkins

(57) ABSTRACT

A wind turbine blade comprising a plurality of spar components extending along the longitudinal axis and providing the main bending stiffness of the wind turbine blade a major principal axis defining a structural pitch angle of at least 1° with respect to a chord line, and including: one or more suction-side spar caps each having a centre line; one or more pressure-side spar caps each having a centre line; and one or more shear webs distributed around a central shear web line and at least one of which being connected to first spar caps, wherein at least one suction-side spar cap centre lines is arranged with a first chordwise distance to the central shear web line, and at least one pressure-side spar cap centre lines is arranged with a second, different, chordwise distance to the central shear web line.

19 Claims, 7 Drawing Sheets

(56) References Cited

U.S. PATENT DOCUMENTS

2017/0058867 A1   3/2017  Yarbrough et al.
2017/0082088 A1*  3/2017  Yarbrough ......... B29D 99/0028
2018/0252202 A1*  9/2018  Johnson ................ B29C 70/342
2018/0297308 A1  10/2018  Hedges et al.
2019/0270261 A1*  9/2019  Randall ................ B29C 70/342

* cited by examiner

AEROELASTIC STABLE WIND TURBINE BLADE

This is a National Phase Application filed under 35 U.S.C. 371 as a national stage of PCT/EP2021/082305, filed Nov. 19, 2021, an application claiming the benefit of Indian Patent Application No. 202041050597, filed Nov. 20, 2020, and also claiming the benefit of British Patent Application No. 2019488.2, filed Dec. 10, 2020, the contents of each of which are hereby incorporated by reference in their entirety.

TECHNICAL FIELD

The present disclosure relates to a wind turbine blade.

BACKGROUND

There is a trend in the wind turbine industry towards larger rotor diameters due to an increase in swept area and therefore greater energy capture. This trend is part of a drive to reduce the overall cost of wind energy. However, larger rotor sizes increase both inertial and aerodynamic loading which, in turn, increases the structural demands of core components, e.g. blades, drivetrain and tower.

The blades are subject to complex loading scenarios and will therefore vibrate with many different vibration shapes. Vibration shapes occur in various forms at different frequencies. The frequencies are known as natural frequencies and each corresponds to a specific vibration shape or vibration mode. The vibration shapes can broadly be categorised into flapwise bending, edgewise bending, and twisting. Flapwise bending occurs in a plane comprising the leading and trailing edge of the blade, edgewise bending occurs in a plane comprising the chord of the blade, while twisting occurs around a longitudinal direction of the blade. All types of vibration can apply significant loads on the blade which can lead to fatigue failure. It is therefore important to avoid excitation of these vibrations but also damping them once being excited.

As blades are typically relatively slender around the chord, the air displacement of edgewise vibrations is smaller than for instance during flapwise vibrations. This volume of displaced air contributes to the aerodynamic damping of the blade and thus edgewise vibrations inherently have lower aerodynamic damping than flapwise vibrations. Therefore, there is an increased risk of long-lasting or even unstable edgewise vibrations.

SUMMARY

On this background, it may be seen as objects of the present disclosure to provide a wind turbine blade with increased damping of edgewise vibrations that is easy and simple to manufacture.

One or more of these objects may be met by aspects of the present disclosure as described in the following.

A first aspect of this disclosure relates to a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising:

- a shell providing an aerodynamic airfoil shape of the wind turbine blade and comprising a pressure side and a suction side; and
- a plurality of spar components extending along the longitudinal axis and providing the main bending stiffness of the wind turbine blade, and including:
  - one or more suction-side spar caps arranged adjacent to the suction side of the shell and at least a first suction-side spar cap, the one or more suction-side spar caps each having a centre line preferably forming part of a plurality of suction-side spar cap centre lines;
  - one or more pressure-side spar caps arranged adjacent to the pressure side of the shell and at least a first pressure-side spar cap, the one or more pressure-side spar caps each having a centre line preferably forming part of a plurality of pressure-side spar cap centre lines; and
  - preferably one shear web extending along a central shear web line, or more shear webs extending in parallel to and being distributed, preferably equally, around a central shear web line, at least one, preferably each, shear web of the one or more shear webs having a suction-side end connected to the first suction-side spar cap and a pressure-side end connected to the first pressure-side spar cap;
- wherein the one or more suction-side spar caps and the one or more pressure-side spar caps preferably provide the main bending stiffness of the wind turbine blade along a major principal axis defining a structural pitch angle of at least 1° with respect to the chord line at least in a first region of the wind turbine blade, and
- wherein at least one centre line of the one or more suction-side spar caps is preferably arranged with a first chordwise distance to the central shear web line at least in the first region of the wind turbine blade, and
- wherein at least one centre line of the one or more pressure-side spar caps is preferably arranged with a second chordwise distance to the central shear web line at least in the first region of the wind turbine blade, the second chordwise distance being different from the first chordwise distance.

In any beam section there is a set of axes, neither of which needs necessarily be an axis of symmetry, for which the planar product second moment of area is zero. Such axes are known as principal axes and the second moments of area about these axes are termed principal second moments of area.

The planar second moment of area of a shape A, e.g. a beam, in a cartesian coordinate system can be calculated by the following formula:

$$I_x = \iint_A y^2 dx dy$$

$$I_y = \iint_A x^2 dx dy$$

Similarly, the planar product moment of area can be calculated by the following formula:

$$I_{xy} = \iint_A yx dx dy$$

wherein the cartesian coordinate system is usually oriented so that the z-direction extends along the longitudinal axis of the wind turbine blade and the XY-plane is a cross-section comprising a chord line of the wind turbine blade. Accordingly, the principal axes can be found by orienting the cartesian coordinate system so that the planar product moment of area is zero. The major principal axis is defined by having the greater planar second moment of area of the two principal axes as calculated using the formulas above. The minor principal axis is perpendicular to the major principal axis.

A structural pitch angle is typically present in any cross-section of conventional wind turbine blades, but not to a degree that provide beneficial damping. A structural pitch angle providing sufficient damping can be obtained by introducing asymmetry in the chordwise stiffness distribution of the suction-side spar cap arrangement relative to the chordwise stiffness distribution of the pressure-side spar cap arrangement of the wind turbine blade. For example, by providing one or more additional spar caps on opposite sides of the first spar caps or by varying the chordwise width of the first spar caps. The number and arrangement of shear webs have non-existent or negligible impact on the structural pitch angle.

By providing a wind turbine blade with sufficient structural pitch angle, the edgewise bending mode may thus be coupled with the flapwise bending mode and thereby increases the aerodynamic damping of edgewise vibrations.

Further, varying the first and second chordwise distance of the corresponding centre lines may have the advantage of easing manufacturability of the wind turbine blade as the first spar caps can be provided symmetrically around the central shear web line. The structural pitch angle can be achieved by including additional second spar caps. Alternatively, the first spar caps can be arranged slightly offset with one of the first spar caps centred on the central shear web line to increase load resistance.

Providing the one or more shear webs connected to the first spar caps may have the advantage of providing an integrated spar beam made up of the first spar caps and shear web(s). This may improve the structural properties of the spar beam while still providing a structural pitch angle. Additionally, the one or more suction-side spar caps may extend along its/their respective centre line(s) and/or the one or more pressure-side spar caps may extend along its/their respective centre line(s).

The centre line(s) may be geometric centre line(s) (e.g. if the material of the respective spar cap is isotropic or transversely isotropic relative to the centre line) or alternatively stiffness centre line(s) (if the material of the spar cap is anisotropic).

In the context of the present disclosure, the material is transversely isotropic if the material has isotropic properties along the longitudinal axis, i.e. unidirectional fibres arranged substantially parallel to the longitudinal axis.

Additionally or alternatively, the structural pitch angle may be in the range of 1° to 10°, 2° to 8°, or 3° to 5°, with respect to the chord line at least in a first region of the wind turbine blade.

Additionally or alternatively, the structural pitch angle may be at least 2°, 3°, 4°, or 5° with respect to the chord line at least in a first region of the wind turbine blade.

The structural pitch angle may be even higher depending on blade length and aeroelastic stability requirements for the blade.

Additionally or alternatively, the first region of the wind turbine blade may extend at least in a first fraction of a length of the wind turbine blade, said fraction being at least 10%, 20%, 30%, 40%, 50%, 60%, 70%, or 80%. Alternatively, the first region may be located between 10% of the blade length to 20% of the blade length when measured from the root end of the blade. The length of the wind turbine blade is the distance between the root end and tip end thereof.

Additionally or alternatively, the first region of the blade may be located in the airfoil region of the blade.

Additionally or alternatively, the first spar caps may comprise a first fibre material, e.g. carbon fibres, glass fibres, or a mix thereof.

Additionally or alternatively, the one or more suction-side spar caps may have an aggregated suction-side centre line which may be arranged with the first chordwise distance to the central shear web line at least in the first region of the wind turbine blade. The one or more pressure-side spar caps may have an aggregated pressure-side centre line which may be arranged with the second chordwise distance to the central shear web line at least in the first region of the wind turbine blade. The second chordwise distance is different from the first chordwise distance.

This provides an increased asymmetric arrangement of the suction-side spar cap(s) relative to the pressure-side spar cap(s) and may increase the aforementioned advantages of an asymmetric spar cap arrangement.

In addition to the centre lines of individual spar caps, the suction-side spar caps and the pressure-side spar caps may further have an aggregated centre line which may be defined as the line having the shortest transverse distance to all points of the respective spar caps. In case of a single suction-side spar cap, the aggregated centre line thus coincides with the individual centre line.

Additionally or alternatively, the central shear web line may extend through the aggregated suction-side centre line or through the aggregated pressure-side centre line.

This may improve the load resistance of the connection between the shear web and spar cap while maintaining the structural pitch angle.

Additionally or alternatively, the central shear web line may extend through the first suction-side spar cap centre line and the first pressure-side spar cap centre line.

Additionally or alternatively, the first suction-side spar cap has a first suction-side chordwise width at least in the first region of the wind turbine blade. The first pressure-side spar cap has a first pressure-side chordwise width at least in the first region of the wind turbine blade. The first chordwise widths being different. The difference between the first chordwise widths is preferably a fraction of the smallest of the first chordwise widths, said fraction preferably being at least 5%, 10%, 15%, 20%, or 25%.

Accordingly, the structural pitch angle may be provided by providing the first spar caps with different first chordwise widths and arranging them with offset aggregated centre lines. The structural pitch angle may be further increased by a greater difference between the first chordwise widths.

Additionally or alternatively, the one or more suction-side spar caps of the plurality of spar components may comprise a second suction-side spar cap arranged adjacent to the suction side of the shell and positioned between the first suction-side spar cap and one of the leading or trailing edges of the wind turbine blade.

Additionally or alternatively, the one or more pressure-side spar caps of the plurality of spar components may comprise a second pressure-side spar cap arranged adjacent to the pressure side of the shell and positioned between the first pressure-side spar cap and the other one of the leading and trailing edges of the wind turbine blade.

This eases the manufacturing of the wind turbine blade as the first spar caps can be laid up conventionally and the structural pitch angle can be obtained by providing second spar cap(s). Additionally or alternatively, the second suction-side spar cap has a second suction-side chordwise width at least in the first region of the wind turbine blade. The second pressure-side spar cap has a second pressure-side chordwise width at least in the first region of the wind turbine blade. The second chordwise widths may each be equal to or less than each of the first chordwise widths.

In the context of the present disclosure, a chordwise width is measured along the contour of the corresponding pressure side or suction side in the chordwise direction of the wind turbine blade.

Additionally or alternatively, the second spar caps may comprise a second fibre material, e.g. carbon fibres, glass fibres, or a mix thereof. The second fibre material may be different from the first fibre material. For instance, the first fibre material may be carbon fibres and the second fibre material may be glass fibres.

Additionally or alternatively, the second spar caps may comprise fibre layers of varying chordwise width. In particular, unidirectional carbon fibre layers of varying chordwise width.

Additionally or alternatively, the first suction-side spar cap and the first pressure-side spar cap may be substantially reflection symmetric with respect to the chord line.

Additionally or alternatively, the second suction-side spar cap and the second pressure-side spar cap may be substantially reflection symmetric with respect to the chord line.

Although the airfoil profile of typical wind turbine blades is, per design, reflection asymmetric with respect to the chord line, in the present disclosure, opposite spar caps are considered symmetric with respect to the chord line if they have substantially the same general shape or contour including the same width and the same height.

This eases the manufacturing of the wind turbine blade as the first spar caps can be laid up conventionally in a substantially symmetrical fashion and the structural pitch angle can be obtained by providing second spar cap(s).

Additionally or alternatively, the second suction-side spar cap may be positioned at a first suction-side distance to the first suction-side spar cap at least in the first region of the wind turbine blade.

The second pressure-side spar cap may be positioned at a first pressure-side distance to the first pressure-side spar cap at least in the first region of the wind turbine blade. The first suction-side distance and/or the first pressure-side distance may be in the range of 0% to a fraction of the chordwise width of the respective second spar cap, said fraction may be 200%, 100%, 50%, 25%, 10%, or 2.5%.

Additionally or alternatively, the second suction-side spar cap may be positioned at a second suction-side distance from the leading and trailing edges at least in the first region of the wind turbine blade. The second pressure-side spar cap may be positioned at a second pressure-side distance from the leading and trailing edges at least in the first region of the wind turbine blade. The second suction-side distance and/or the second pressure-side distance may be equal to or greater than a fraction of the chordwise width of the respective second spar cap, said fraction may be 100%, 150%, 200%, 250%, or 300%.

Additionally or alternatively, the one or more suction-side spar caps, e.g. the first and/or second suction-side spar caps, and the one or more pressure-side spar caps, e.g. the first and/or second pressure-side spar caps, may each comprise or consist essentially of a transversely isotropic material, e.g. unidirectional fibres. The respective centre lines of the one or more suction-side and pressure-side spar caps may thus be geometric centre lines.

A transversely isotropic material is one with physical properties that are symmetric about an axis, e.g. the longitudinal axis of the wind turbine blade, that is normal to a plane of isotropy, e.g. a cross-section of the wind turbine blade. This transverse or cross-sectional plane has infinite planes of symmetry of the respective transversely isotropic material and thus, within this plane, the material properties of the transversely isotropic material are the same in all directions. Such materials may also be known as polar anisotropic materials.

Additionally or alternatively, the one or more suction-side spar caps, e.g. the first and/or second suction-side spar caps, and/or the one or more pressure-side spar caps, e.g. the first and/or second pressure-side spar caps, may each comprise or consist essentially of an anisotropic material, e.g. a mix of carbon and glass fibres, and the plurality of suction-side centre lines, e.g. the aggregated, first and/or second suction-side spar cap centre lines, and the plurality of pressure-side centre lines, e.g. the first and/or second pressure-side spar cap centres, are centres of stiffness.

In the context of the present disclosure, a centre of stiffness may be defined as a centroid of a stiffness distribution when viewed in a cross-section perpendicular to the longitudinal axis of the wind turbine blade.

Additionally or alternatively, the first spar caps and/or second spar caps may be fibre-reinforced laminate structure(s) and may each have a respective primary fibre direction oriented at least partially, preferably mainly, along the longitudinal axis of the wind turbine blade.

Additionally or alternatively, the first spar caps and/or the second spar caps may each comprise a plurality of precured elements, e.g. pultrusions. For instance, the structural pitch angle may be provided by arranging pultrusions asymmetrically in the first spar caps, e.g. by arranging more pultrusions towards the leading edge compared to towards the trailing edge in one of the first spar caps and correspondingly arranging more pultrusions towards the trailing edge compared to towards the leading edge in the other one of the first spar caps.

Additionally or alternatively, each spar cap may comprise a plurality of unidirectional fibre layers, each having a fibre layer orientation, wherein a weighted average of the fibre orientations of the plurality of fibre layers defines the primary fibre orientation of the respective spar cap.

Additionally or alternatively, the first suction-side spar cap and/or the first pressure-side spar cap may comprise(s) a first material being glass fibres, carbon fibres, natural fibres, wood fibres, or a mixture thereof, e.g. a mixture of glass and carbon fibres.

Additionally or alternatively, the second suction-side spar cap and/or the second pressure-side spar cap may comprise(s) a second material being glass fibres, carbon fibres, natural fibres, wood fibres, or a mixture thereof, e.g. a mixture of glass and carbon fibres.

Additionally or alternatively, the second material, e.g. glass fibres, may be different from the first material, e.g. carbon fibres.

Additionally or alternatively, the one or more suction-side spar caps of the plurality of spar components may be at least partially, preferably fully, embedded in the shell, preferably in a suction-side shell part, of the wind turbine blade.

Additionally or alternatively, the one or more pressure-side spar caps of the plurality of spar components may be at least partially, preferably fully, embedded in the shell, preferably in a pressure-side shell part of the wind turbine blade, preferably being separate from the suction-side shell part.

In the context of the present disclosure, the term "spar cap" may be understood as a load-carrying element providing the main bending stiffness of the wind turbine blade. The first spar caps may be primary spar caps providing the main bending stiffness of the wind turbine blade and the second spar caps may be secondary spar caps providing stiffness asymmetry to provide sufficient structural pitch angle to improve the aeroelastic stability of the blade. In particular, the second spar caps may be formed of a plurality of unidirectional fibre layers, e.g. carbon fibre layers, of varying widths and preferably being arranged adjacent to the first spar caps.

A second aspect of the present disclosure relates to a wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising:
- a shell providing an aerodynamic airfoil shape of the wind turbine blade and comprising a pressure side and a suction side;
- a plurality of spar components extending along the longitudinal axis and providing the main bending stiffness of the wind turbine blade, and including:
  - one or more suction-side spar caps arranged adjacent to the suction side of the shell and including at least a first suction-side spar cap;
  - one or more pressure-side spar caps arranged adjacent to the pressure side of the shell and including at least a first pressure-side spar cap; and
  - preferably one shear web extending along a central shear web line, or preferably more shear webs extending in parallel to and being distributed, preferably equally, around a central shear web line, each shear web having a suction-side end connected to the one or more suction-side spar caps and a pressure-side end connected to the one or more pressure-side spar caps;

wherein the one or more suction-side spar caps and the one or more pressure-side spar caps are structurally and/or geometrically transflection asymmetric with respect to the chord line at least in the first region of the wind turbine blade.

In the context of the present disclosure, transflection symmetry (which may also be known as glide reflection symmetry) may be defined as the case where a reflection of an object in a line or plane combined with a translation of the reflected object along the line or in the plane, results in the same object. For example, a line of corresponding footprints has transflection symmetry. In the present context, both a geometric transflection asymmetry and a structural transflection asymmetry are intended to be covered by the term "transflection asymmetry". A structural transflection asymmetry is defined as stiffness distribution being asymmetrically distributed, for instance by mixing materials of different stiffness, e.g. glass and carbon fibres, asymmetrically.

Additionally, the one or more suction-side spar caps and the one or more pressure-side spar caps of the plurality of spar components may provide the main bending stiffness of the wind turbine blade along a major principal axis forming a structural pitch angle of at least 1° with respect to the chord line.

A transflection asymmetric arrangement of the structural portions in the airfoil region may have the advantage of structurally coupling the edgewise bending stiffness with the flapwise bending stiffness thereby increasing the aerodynamic damping of the edgewise bending mode by inducing some flapwise bending.

The skilled person will appreciate that the wind turbine blade according to the second aspect may be combined with any embodiment of the wind turbine blade according to first aspect alone or in combination with additional one or more embodiment(s) of the first aspect.

A third aspect of the present disclosure relates to a wind turbine comprising one or more wind turbine blades according to the first or second aspect of this disclosure.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of the present disclosure will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment does not need to have all the aspects or advantages shown. An aspect or an advantage described in conjunction with a particular embodiment is not necessarily limited to that embodiment and can be practiced in any other embodiment even if not so illustrated, or if not so explicitly described.

DETAILED DESCRIPTION OF THE INVENTION

Figure 1:
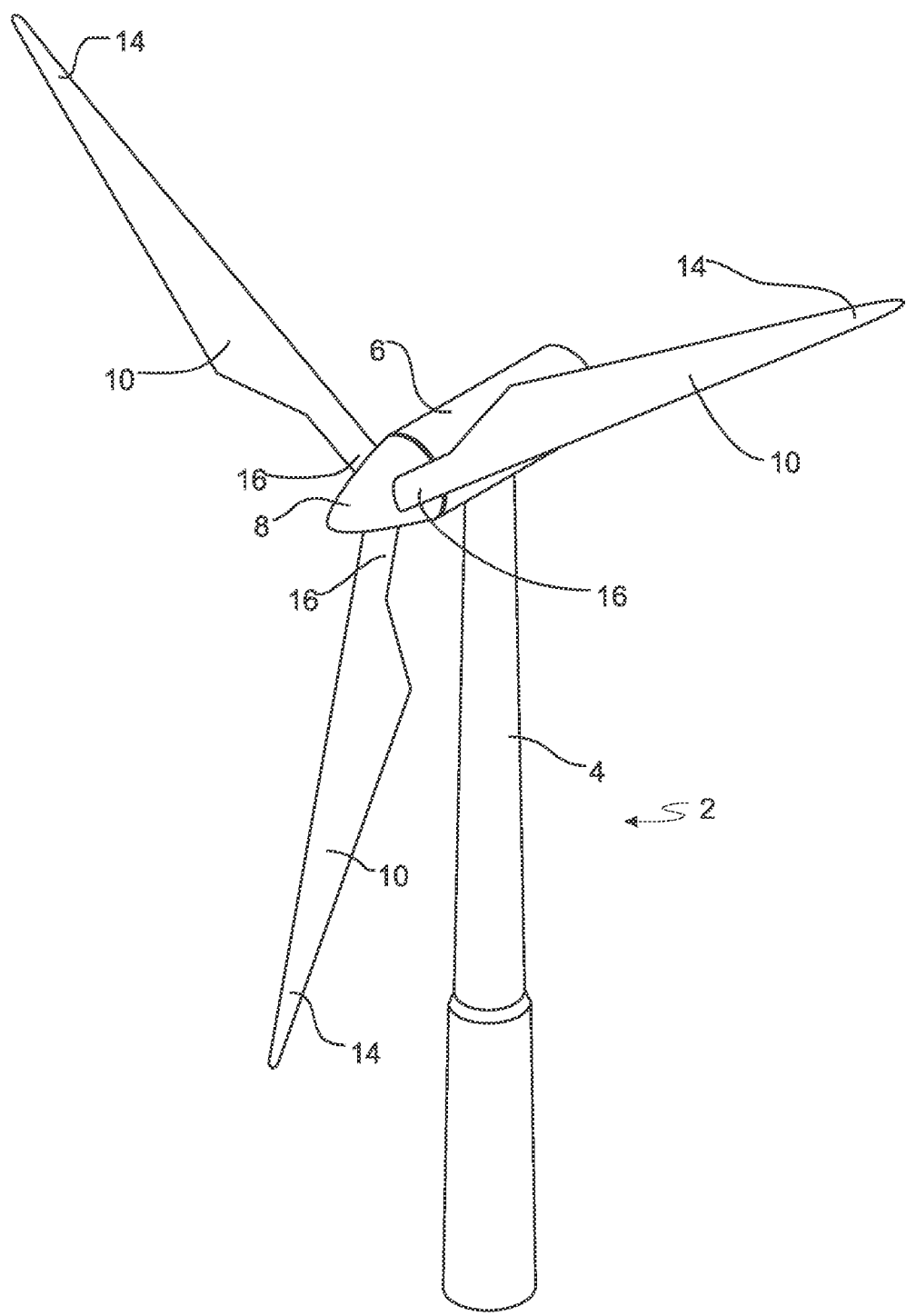
FIG. 1 is a schematic diagram illustrating a perspective view of an exemplary wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
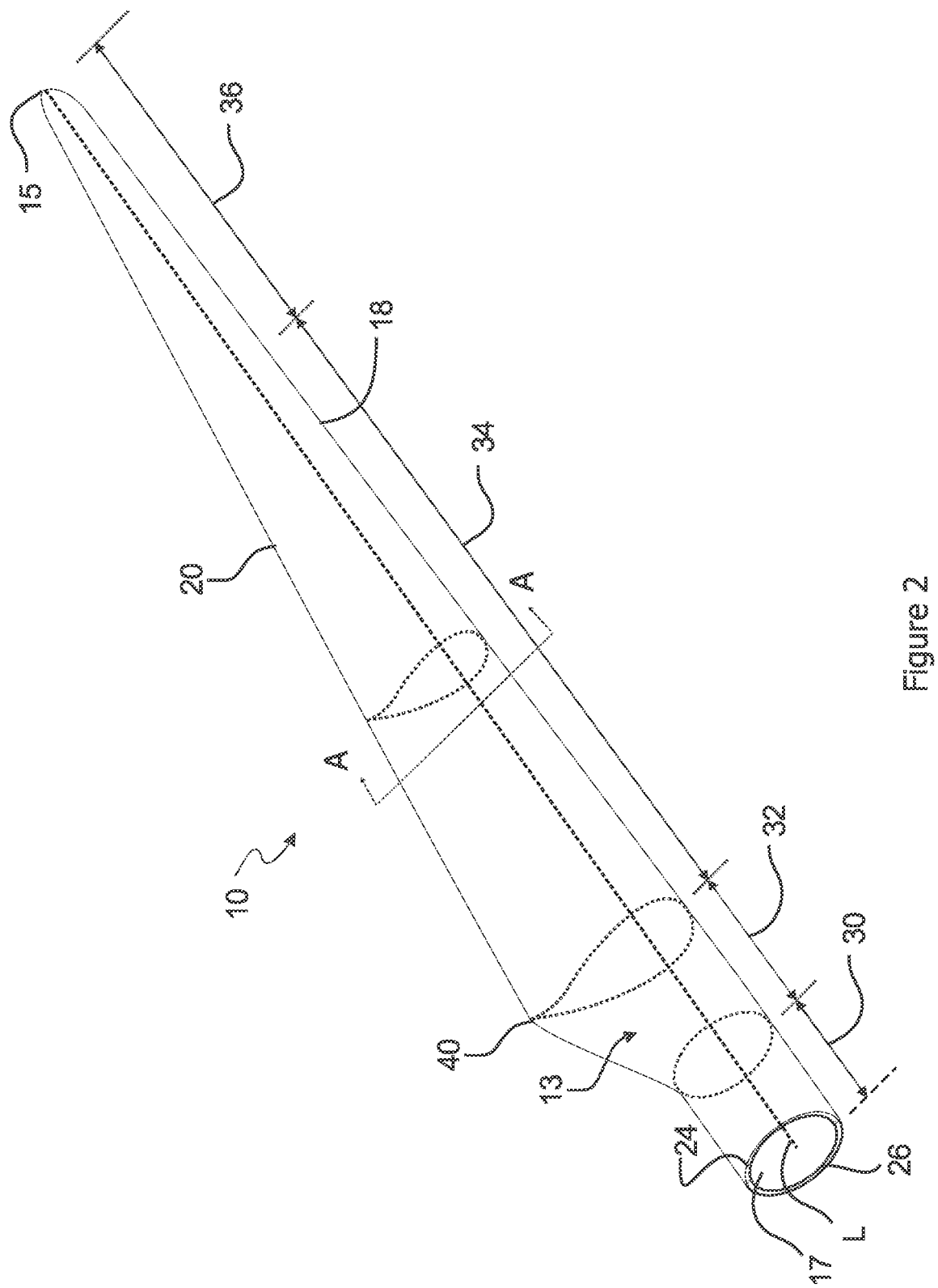
FIG. 2 is a schematic diagram illustrating a perspective view of an exemplary wind turbine blade illustrating cross-sectional line A-A.
Figure 3A:
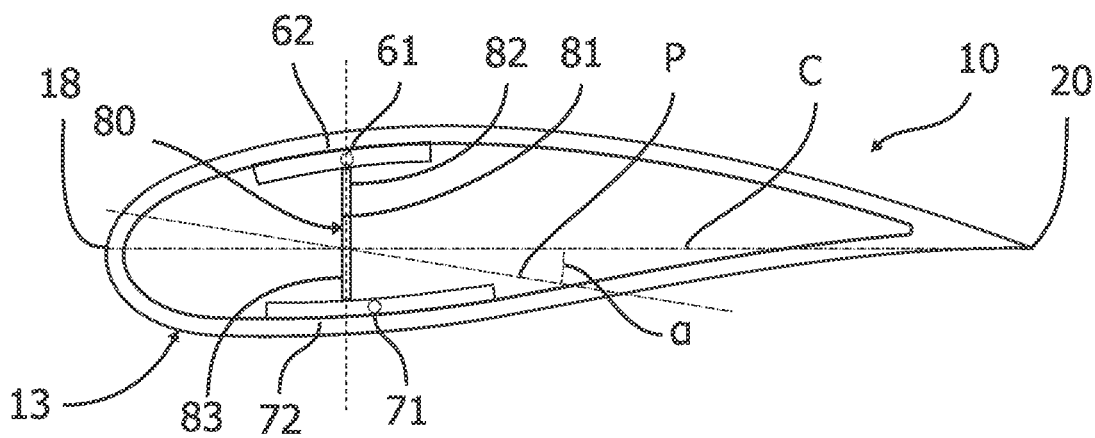
FIGS. 3A-7C are schematic diagrams illustrating a cross-sectional view along cross-sectional line A-A of FIG. 2 of different spar cap arrangements of a wind turbine blade.
Figure 3B:
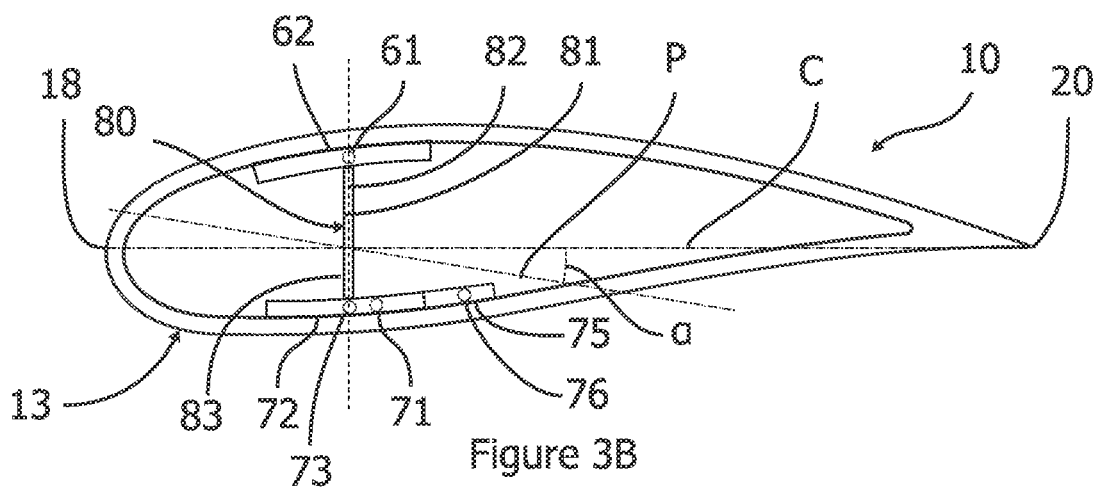
Figure 3C:
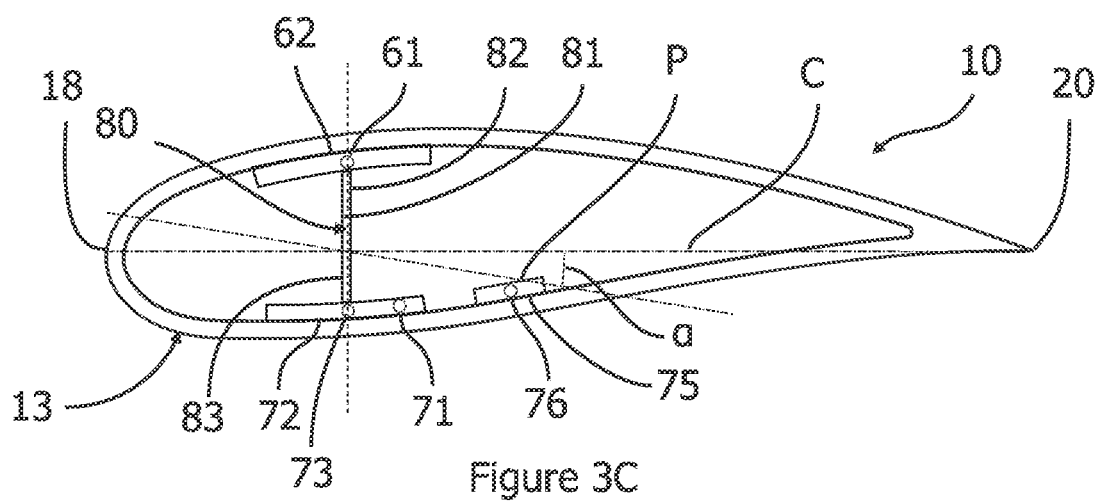
Figure 4A:
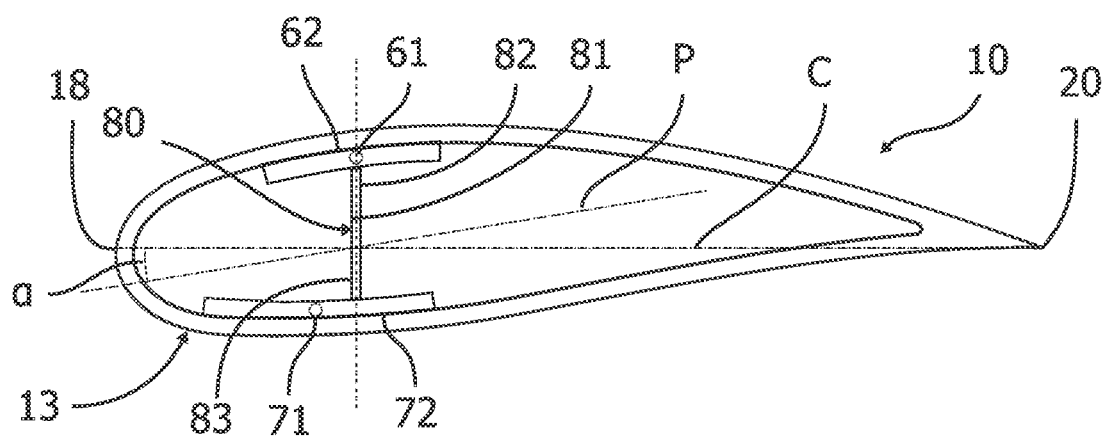
Figure 4B:
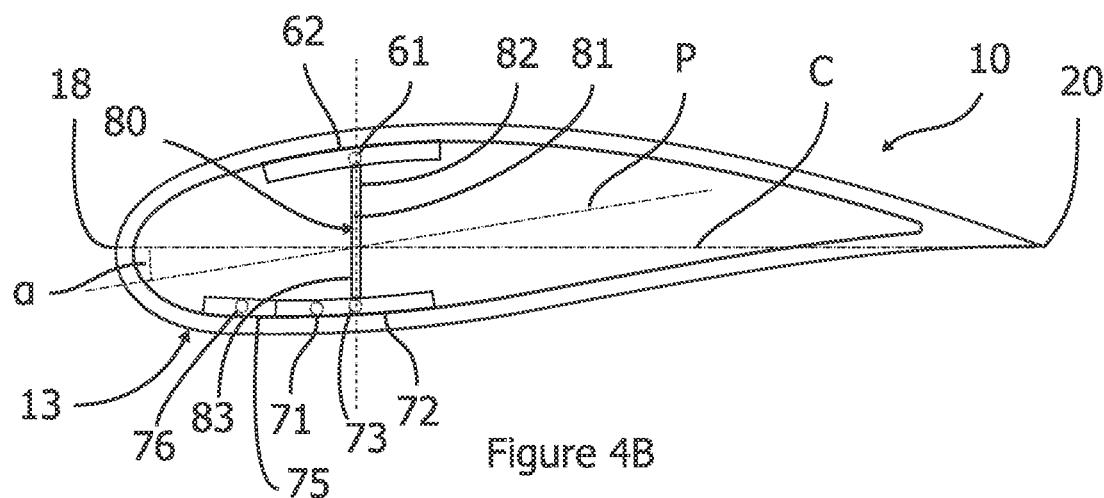
Figure 4C:
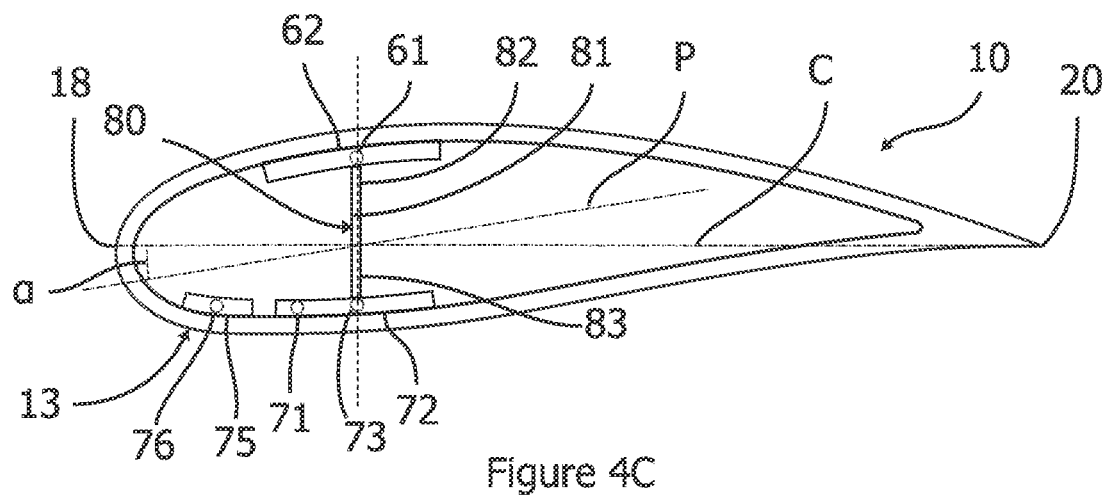
Figure 5A:
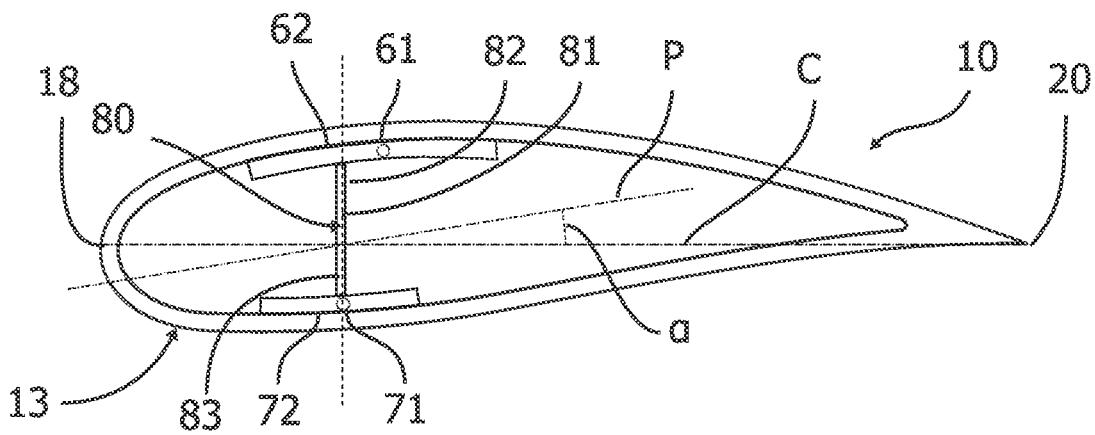
Figure 5B:
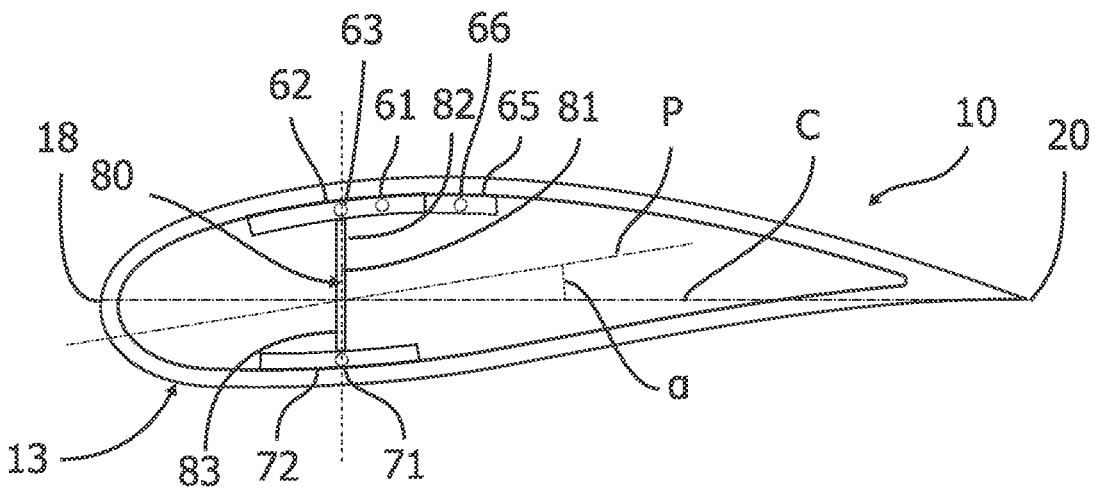
Figure 5C:
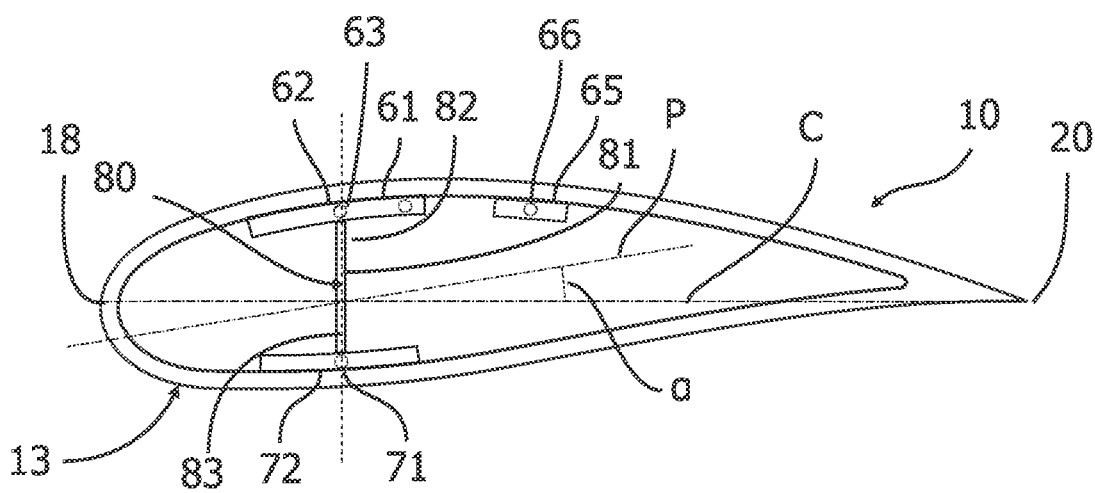
Figure 6A:
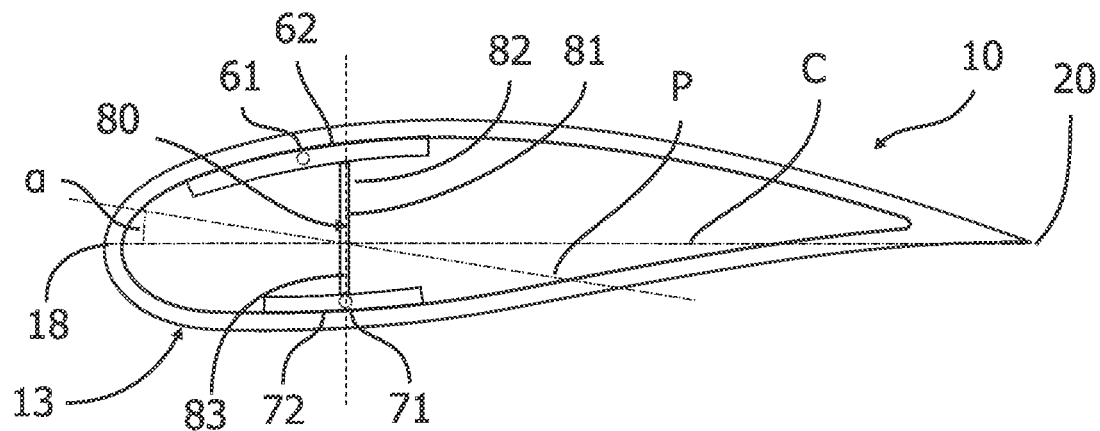
Figure 6B:
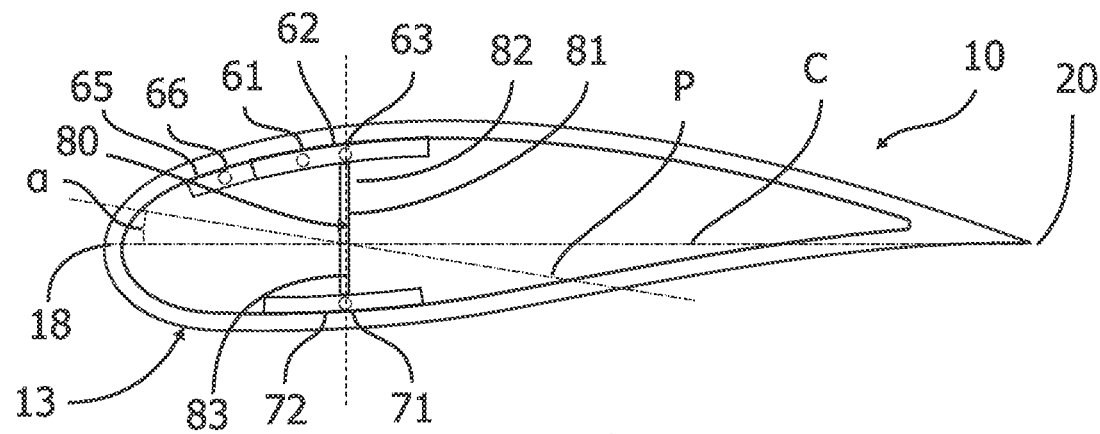
Figure 6C:
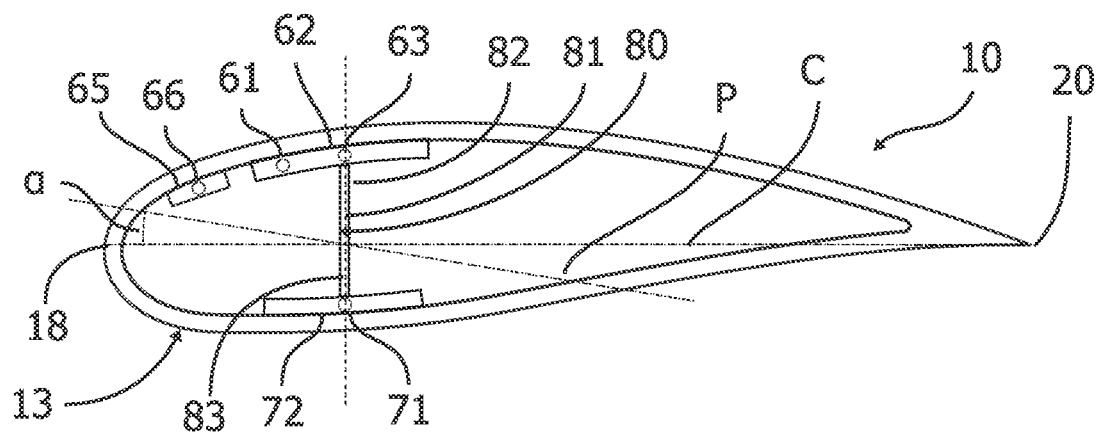

FIG. 2 shows a schematic view of an exemplary wind turbine blade 10. The wind turbine blade 10 has the shape of a conventional wind turbine blade 10 extending along a longitudinal axis L between a root end 17 and a tip end 15 and comprises a root region 30 closest to the hub, a profiled or an airfoil region 34 furthest away from the hub and a transition region 32 between the root region 30 and the airfoil region 34. The airfoil region 34 includes a tip region 36 with the tip end 15. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing radial distance from the hub. The airfoil region 34 has an airfoil profile with a chord extending between the leading edge 18 and the trailing edge 20 of the blade 10. The width of the chord decreases with increasing radial distance from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints extending along the trailing edge 20 and the leading edge 18 of the blade 10. Typically, the root ends of the blade shell parts 24, 26 have a semi-circular or semi-oval outer cross-sectional shape. The blade shell parts 24, 26 define the aerodynamic shape of the wind turbine blade and comprise a plurality of spar components extending along the longitudinal axis and provide the main bending stiffness of the blade 10.

Turning to FIGS. 3A-7C, different arrangements of the plurality of spar components 62, 65, 72, 75, 80 are illustrated. Overall, the plurality of spar components comprises one or more suction-side spar caps 62, 65 arranged adjacent to the suction side of the shell and one or more pressure-side spar caps 72, 75 arranged adjacent to the pressure side of the shell.

The one or more suction-side spar caps include at least a first suction-side spar cap 62 as shown in all FIGS. 3A-7C but may also further include a second suction-side spar cap 65 as shown in FIGS. 5B-5C, 6B-6C, and 7B-7C. Further, the one or more suction-side spar caps 62, 65 each have a suction-side spar cap centre line 63, 66, respectively, forming part of a plurality of suction-side spar cap centre lines. Further, the one or more suction-side spar caps 62, 65 have an aggregated suction-side centre line 61.

Correspondingly, the one or more pressure-side spar caps include at least a first pressure-side spar cap 72 as shown in all FIGS. 3A-7C but may also further include a second pressure-side spar cap 75 as shown in FIGS. 3B-3C, 4B-4C, and 7A-7C. Further, the one or more pressure-side spar caps 72, 75 each have a plurality of pressure-side centre lines 73, 76, respectively, forming part of a plurality of suction-side spar cap centre lines. Further, the one or more pressure-side spar caps 72, 75 in combination have an aggregated pressure-side centre line 71.

Figure 7A:
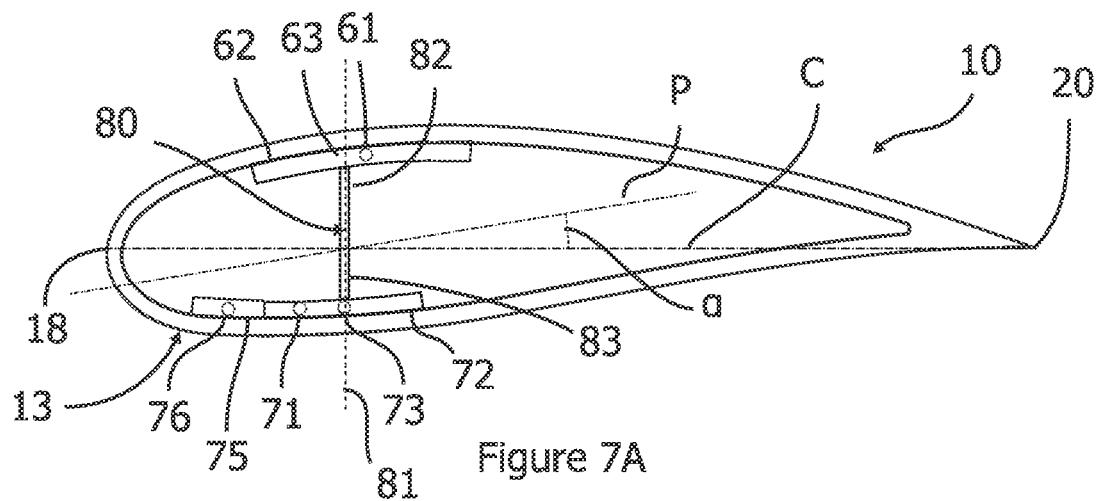
Figure 7B:
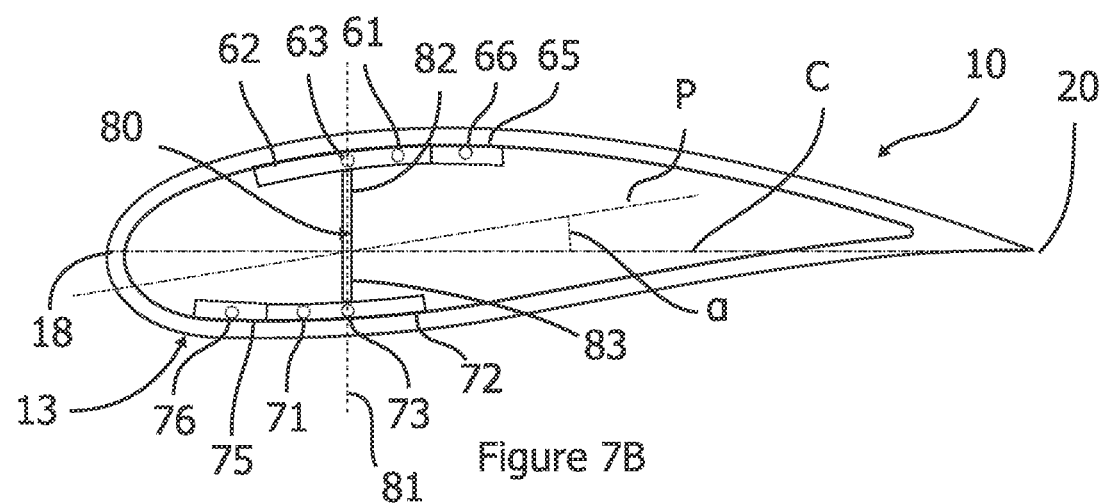
Figure 7C:
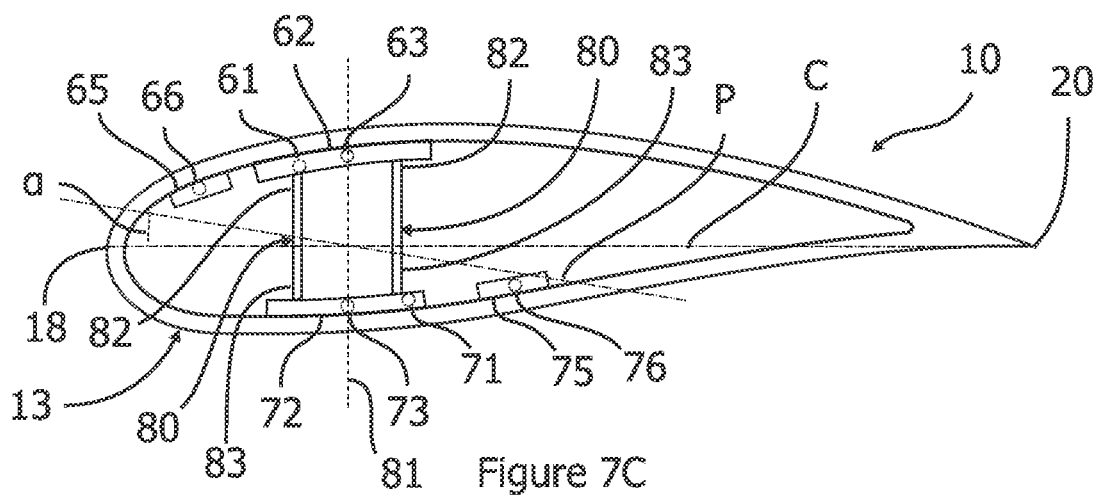

In all of the shown embodiments except for FIG. 7C, the plurality of spar components further comprises a single shear web 80 extending along a central shear web line 81 and having a suction-side end 82 connected to the first suction-side spar cap 61 and a pressure-side end 83 connected to the first pressure-side spar cap 71. However, more shear webs 80 may be included and distributed around the central shear web line 81 as shown in FIG. 7C. The central shear web line 81 extends perpendicularly to the chord line C.

The one or more suction-side spar caps 62, 65 and one or more pressure-side spar cap 72, 75 are arranged asymmetrically so as to provide the main bending stiffness of the wind turbine blade along a major principal axis P defining a structural pitch angle α of at least 1° (shown exaggerated in FIGS. 3A-7C for illustrative purposes) with respect to the chord line C at least in a first region of the wind turbine blade 34. In these cases, the first section is equivalent to the airfoil region 34 as shown in FIG. 2 but in other embodiments the first section may be a subset of the airfoil region 34.

Common for all the illustrated embodiments is that at least one of the plurality of suction-side centre lines 61, 63, 66 is arranged with a first chordwise distance to the central shear web line 81, and that at least one of the plurality of pressure-side centre lines 71, 73, 76 is arranged with a second chordwise distance to the central shear web line 81, and the second chordwise distance is different from the first chordwise distance. For instance in FIG. 3A, the aggregated suction-side centre line 61 (which coincides with the first suction-side spar cap centre line) is arranged with a chordwise distance of zero to the central shear web line 81 while the aggregated pressure-side centre line 71 is distanced from the central shear web line 81 due to the increased width of the first pressure-side spar cap 72 relative to the first suction-side spar cap 62. Correspondingly in FIG. 7B, the chordwise distance of the second suction-side spar cap centre line 66 is different from the chordwise distance of both the aggregated 71 and the first pressure-side spar cap centre line 63, both with respect to the central shear web line 81.

Further, the first 62, 72 and second spar caps 65, 75 are fibre-reinforced laminate structures each consisting essentially of a transverse isotropic composite material in the form of layers of unidirectional fibres embedded in a resin matrix: unidirectional carbon fibres for the first spar caps 62, 72 and unidirectional glass fibres for the second spar caps 65, 75. The unidirectional fibres are oriented along the longitudinal axis L.

FIGS. 3A-6C, 7A, and 7C illustrate embodiments with a difference in chordwise distances of respective aggregated spar cap centre lines 61, 71 and FIGS. 3A-6C illustrate embodiments in which the central shear web line 81 extends through the aggregated suction-side spar cap centre line 61 or the aggregated pressure-side spar cap centre line 71.

FIGS. 3B-3C, 4B-4C, 5B-5C, 6B-6C, and 7C illustrate embodiments in which the first suction-side spar cap 62 and the first pressure-side spar cap 72 are substantially reflection symmetric with respect to the chord line C. In these embodiments, the central shear web line 81 also extends through both centre lines 63, 73 of the first spar caps 62, 72 (which coincide with the corresponding aggregated centre line in embodiments with a single respective spar cap, e.g. on the suction side in FIGS. 3A-4C).

In FIGS. 3B, 4B, 5B, 6B, 7A, and 7B the second spar caps 65, 75 are arranged adjacent or even in contact with the first spar caps 62, 72 and thus have a corresponding first chordwise distance of approximately 0% of the chordwise width of the respective second spar cap 65, 75.

In FIGS. 3C, 4C, 5C, 6C, and 7C the second spar caps 65, 75 are distanced from the first spar caps 62, 72.

LIST OF REFERENCES

| | |
|---|---|
| 2 | wind turbine |
| 4 | tower |
| 6 | nacelle |
| 8 | hub |
| 10 | blade |
| 11 | root blade segment |
| 12 | tip blade segment |
| 13 | shell |
| 14 | blade tip |
| 15 | tip end |
| 16 | blade root |
| 17 | root end |
| 18 | leading edge |
| 20 | trailing edge |
| 24 | pressure side |
| 26 | suction side |
| 30 | root region |
| 32 | transition region |
| 34 | airfoil region |
| 36 | tip region |
| 40 | shoulder |
| 50 | plurality of spar components |
| 61 | aggregated suction-side centre line |
| 62 | first suction-side spar cap |
| 63 | first suction-side spar cap centre line |
| 65 | second suction-side spar cap |
| 66 | second suction-side spar cap centre line |
| 71 | aggregated pressure-side centre line |
| 72 | first pressure-side spar cap |
| 73 | first pressure-side spar cap centre line |
| 75 | second pressure-side spar cap |
| 76 | second pressure-side spar cap centre line |
| 80 | shear web |
| 81 | central shear web line |
| 82 | suction-side end |
| 83 | pressure-side end |
| L | longitudinal axis |
| C | chord line |
| P | major principal axis |
| α | structural pitch angle |

The invention claimed is:

1. A wind turbine blade extending along a longitudinal axis from a root to a tip, the wind turbine blade comprising a root region and an airfoil region with the tip, the wind turbine blade comprising a chord line extending between a leading edge and a trailing edge, the wind turbine blade comprising:
  a shell providing an aerodynamic airfoil shape of the wind turbine blade and comprising a pressure side and a suction side; and
  a plurality of spar components extending along the longitudinal axis and providing the main bending stiffness of the wind turbine blade, and including:
    one or more suction-side spar caps arranged adjacent to the suction side of the shell and including at least a first suction-side spar cap, the one or more suction-side spar caps each having a centre line;
    one or more pressure-side spar caps arranged adjacent to the pressure side of the shell and including at least a first pressure-side spar cap, the one or more pressure-side spar caps each having a centre line; and
    one or more shear webs extending in parallel to and being distributed around a central shear web line, at least one shear web having a suction-side end connected to the first suction-side spar cap and a pressure-side end connected to the first pressure-side spar cap,
  wherein the one or more suction-side spar caps and the one or more pressure-side spar caps provide the main bending stiffness of the wind turbine blade along a major principal axis defining a structural pitch angle of at least 1° with respect to the chord line at least in a first region of the wind turbine blade,
  wherein at least one centre line of the one or more of suction-side spar caps is arranged with a first chordwise distance to the central shear web line at least in the first region of the wind turbine blade, and
  wherein at least one centre line of the one or more of pressure-side spar caps is arranged with a second chordwise distance to the central shear web line at least in the first region of the wind turbine blade, the second chordwise distance being different from the first chordwise distance.

2. The wind turbine blade according to claim 1, wherein the one or more suction-side spar caps further has an aggregated suction-side centre line being arranged with the first chordwise distance to the central shear web line at least in the first region of the wind turbine blade, and the one or more pressure-side spar caps further has an aggregated pressure-side centre line being arranged with the second chordwise distance to the central shear web line at least in the first region of the wind turbine blade, the second chordwise distance being different from the first chordwise distance.

3. The wind turbine blade according to claim 2, wherein the central shear web line extends through the aggregated suction-side centre line or through the aggregated pressure-side centre line.

4. The wind turbine blade according to claim 1, wherein the first suction-side spar cap has a first suction-side chordwise width at least in the first region of the wind turbine blade, and the first pressure-side spar cap has a first pressure-side chordwise width at least in the first region of the wind turbine blade, the first chordwise widths being different.

5. The wind turbine blade according to claim 1, wherein the one or more suction-side spar caps additionally comprises a second suction-side spar cap arranged adjacent to the suction side of the shell and positioned between the first suction-side spar cap and one of the leading and trailing edges of the wind turbine blade, and/or
  wherein the one or more pressure-side spar caps additionally comprise a second pressure-side spar cap arranged adjacent to the pressure side of the shell and positioned between the first pressure-side spar cap and the other one of the leading and trailing edges of the wind turbine blade.

6. The wind turbine blade according to claim 5, wherein the first suction-side spar cap and the first pressure-side spar cap are substantially reflection symmetric with respect to the chord line.

7. The wind turbine blade according to claim 5, wherein the second suction-side spar cap is positioned at a first suction-side distance to the first suction-side spar cap at least in the first region of the wind turbine blade, and/or
  wherein the second pressure-side spar cap is positioned at a first pressure-side distance to the first pressure-side spar cap at least in the first region of the wind turbine blade,
  wherein the first suction-side distance and/or the first pressure-side distance are in the range of 0% to 50% of the width of the respective one of the second suction-side and pressure-side spar caps.

8. The wind turbine blade according to claim 5, wherein the second suction-side spar cap is positioned at a second suction-side distance from the leading and trailing edges at least in the first region of the wind turbine blade, and/or wherein the second pressure-side spar cap is positioned at a second pressure-side distance from the leading and trailing edges at least in the first region of the wind turbine blade, wherein the second suction-side distance and/or the second pressure-side distance is equal to or greater than 100% of the chordwise width of the respective one of the second suction-side and pressure-side spar caps.

9. The wind turbine blade according to claim 5, wherein the second suction-side spar cap and the second pressure-side spar cap comprise a transversely isotropic material at least in the first region of the wind turbine blade, and wherein the respective centre lines thereof are geometric centre lines.

10. The wind turbine blade according to claim 5, wherein the second suction-side spar cap and the second pressure-side spar cap are fibre-reinforced laminate structures and each has a respective primary fibre direction oriented at least partially along the longitudinal axis of the wind turbine blade.

11. The wind turbine blade according to claim 1, wherein the first suction-side spar cap and the first pressure-side spar cap comprise a transversely isotropic material at least in the first region of the wind turbine blade, and wherein respective centre lines of the first suction-side spar cap and the first pressure-side spar cap are geometric centre lines.

12. The wind turbine blade according to claim 11, wherein the transversely isotropic material comprises a unidirectional fibre material.

13. The wind turbine blade according to claim 1, wherein the first suction-side spar cap and the first pressure-side spar cap are fibre-reinforced laminate structures and each has a respective primary fibre direction oriented at least partially along the longitudinal axis of the wind turbine blade.

14. The wind turbine blade according to claim 13, wherein the first suction-side spar cap and/or the first pressure-side spar cap comprise a first material being glass fibres, carbon fibres, natural fibres, wood fibres, and/or a mixture thereof.

15. The wind turbine blade according to claim 14, wherein the first material comprises a mixture of glass and carbon fibres.

16. The wind turbine blade according to claim 14, wherein the second suction-side spar cap and/or the second pressure-side spar cap comprise a second material being glass fibres, carbon fibres, natural fibres, wood fibres, and/or a mixture thereof.

17. The wind turbine blade according to claim 16, wherein the second material comprises a mixture of glass and carbon fibres.

18. The wind turbine blade according to claim 16, wherein the second material is different from the first material.

19. The wind turbine blade according to claim 18, wherein the second material comprises glass fibres and the first material comprises carbon fibres.

* * * * *